United States Patent [19]

Polster

[11] 3,948,419
[45] Apr. 6, 1976

[54] BEVERAGE FLUID FLOW CONTROLLER

[75] Inventor: Louis S. Polster, Los Angeles, Calif.

[73] Assignee: Concession Service Corporation, Lynwood, Calif.

[22] Filed: Aug. 1, 1974

[21] Appl. No.: 493,781

[52] U.S. Cl. ............ 222/61; 137/505.13; 222/129.1
[51] Int. Cl.² ............................................ B67D 5/14
[58] Field of Search ................. 137/505.13, 505.15; 222/52, 61, 129.1, 145

[56] References Cited
UNITED STATES PATENTS

| | | | |
|---|---|---|---|
| 1,907,162 | 5/1933 | Webb | 137/505.13 X |
| 1,923,595 | 8/1933 | Temple | 137/505.13 X |
| 2,226,611 | 12/1940 | McCollum | 137/505.13 X |
| 2,733,730 | 2/1956 | Turak | 137/505.13 |
| 3,653,548 | 4/1972 | Kotscha | 222/145 X |

Primary Examiner—Stanley H. Tollberg
Assistant Examiner—Hadd Lane
Attorney, Agent, or Firm—Allan M. Shapiro

[57] ABSTRACT

Beverage fluid flow controller in line between pressurized beverage tank and beverage dispensing valve has a valve spool area at syrup pressure which is balanced by spring. A land on the spool automatically adjusts orifice flow area as syrup pressure varies so as to compensate for such variations and maintain a constant flow rate, and such adjusted flow area is independent of variations in dispensing valve operation.

8 Claims, 5 Drawing Figures

U.S. Patent  April 6, 1976  3,948,419
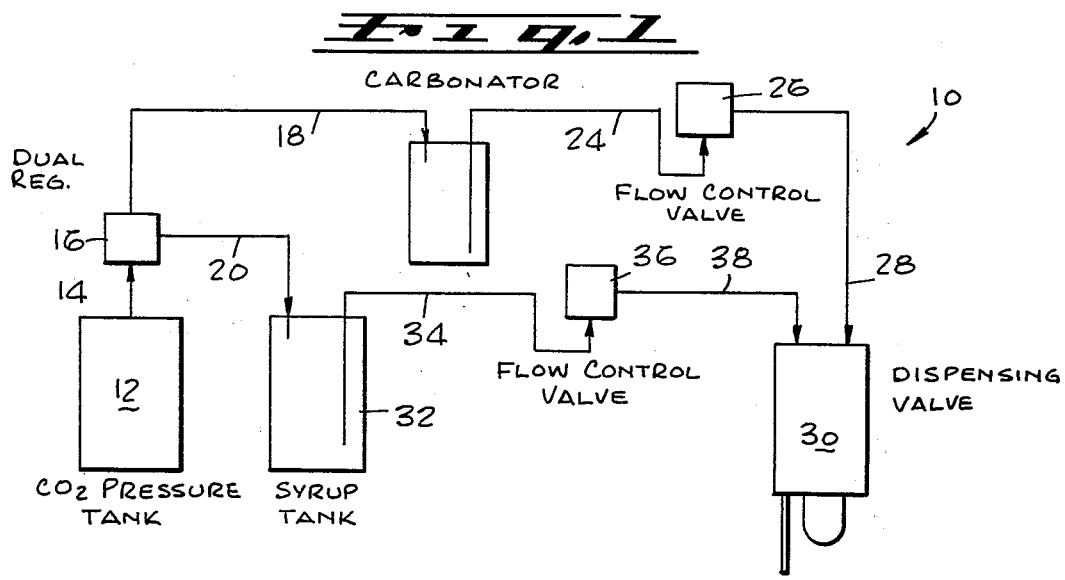
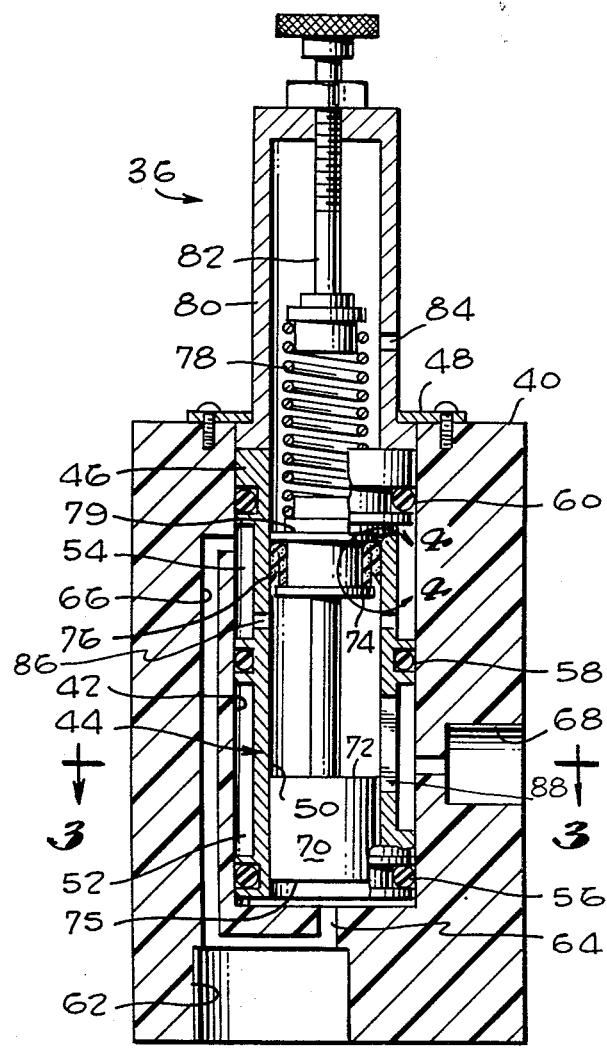
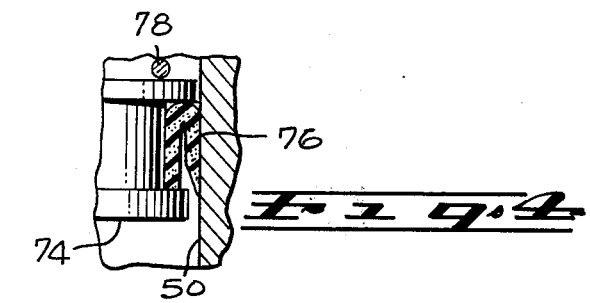
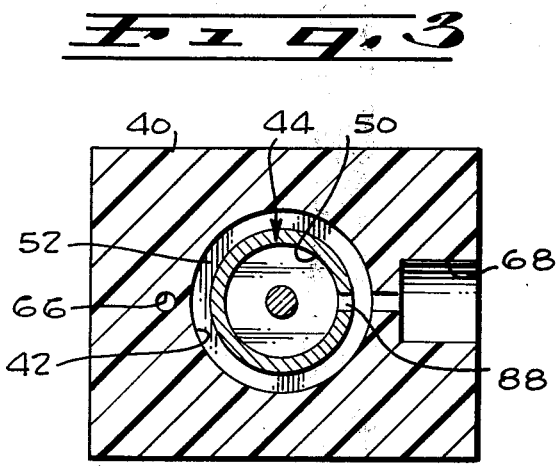
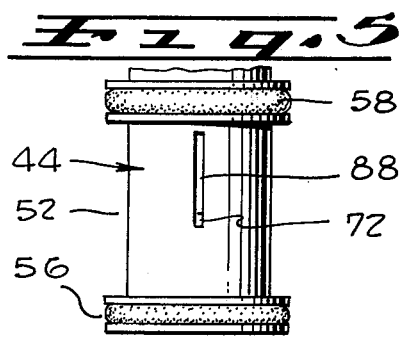

BEVERAGE FLUID FLOW CONTROLLER

BACKGROUND OF THE INVENTION

1. Field of the Invention

This invention is directed to a beverage fluid flow controller for controlling the flow of beverage syrup and carbonated water to a dispensing valve, such flow rate being adjusted against variations in supply and uniformly responsive to dispensing valve operation.

2. Description of the Prior Art

The prior art includes soft drink dispensing systems where a carbon dioxide pressure tank provides carbon dioxide gas to pressurize a syrup tank and to provide carbon dioxide to carbonate water. A dispensing valve receives both of these soft drink liquid components and simultaneously dispenses and mixes them when the dispensing valve is opened. Welty U.S. Pat. No. 3,468,137 discloses such a system. In attempts to assure that the quality of the drink is maintained under varying operating conditions, such as changes in the viscosity of the syrup or changes in the pressure of the carbon dioxide gas, a flow controller valve such as that shown in Welty U.S. Pat. No. 3,335,749 is employed in the pressurized syrup control line in an attempt to maintain a constant syrup flow rate independent of variations in supply pressure. Such flow controller valves generally have not performed satisfactorily over all desired ranges of supply pressure and, further, have suffered from other insufficiencies discussed herein.

Temperature and pressure variations cause variations in the pressure in the syrup and carbonated water flow line, resulting in non-uniformity of flow and consequent lack of drink uniformity which is objectionable to the consumer. When the syrup is below limits, the beverage is too thin; when the syrup is in excess of desired limits, the beverage is too syrupy and sweet. Furthermore, in this case, too much syrup results in a beverage which is expensive to the proprietor. Thus, for proper quality control and economy in the provision of the right quantity of syrup, the flow rate must be controlled in accordance with supply pressure so as to compensate for variations in such pressure, thereby preventing variations in flow rate due to variations in supply pressure.

Furthermore, many operators of the hand-operated dispensing valve turn the valve on and off rapidly, particularly during the last stage of the glass-filling operation in an attempt to obtain a full glass without foaming over. The flow controllers of the prior art respond to such rapid variations in actual flow by severely fluctuating in the quality of their flow control function. In some cases, relatively large quantities of syrup which may be called "slugs" are caused to be ejected forcefully from the flow controller into the flow line so as to be dispensed from the dispensing valve in a non-uniform ratio to the carbonated water, thus excessively strengthening the syrup-to-water ratio beyond tolerable limits as well as in a non-uniform manner. This condition is believed to occur generally in the flow controllers of this art because their functional control of flow rate is dependent upon a relatively constant flow condition such as, for example, merely compensating for slow changes in supply pressure without provision for rapid accommodation to rapid variations in actual flow conditions. Thus, for example, the flow controllers of the prior art do not take into account the problems which arise with rapid on and off operation of the dispensing valve downstream from the flow controller.

SUMMARY OF THE INVENTION

In order to aid in the understanding of this invention, it can be stated in essentially summary form that it is directed to a beverage fluid flow controller where a valve spool has beverage fluid supply pressure on one end and a balancing spring on the other. A shaped control orifice is positioned adjacent a land on the spool so that variations in supply pressure move the spool so that the spool land adjusts the orifice area by the extent of restriction to maintain fluid flow substantially constant. Oppositely of the pressure end, the spool is exposed to the atmosphere so that spool land restriction of the orifice is dependent solely on the force of the supply pressure acting against the spring force.

It is thus an object to provide a fluid flow controller which is capable of maintaining beverage fluid flow rate substantially constant despite changes in input pressure. It is a further object to substantially eliminate the mixing of beverages with the incorrect amount of syrup due to changes in beverage fluid flow rate due to variations in beverage fluid supply pressure or manner of operator manipulation of the dispensing valve, with the valve controlling flow rate capabilities so that syrup flow rate will be dependent only upon the actual flow function of the dispensing valve. It is another object to provide a fluid flow controller which is economic of construction and of reliable characteristics so that it can be economically installed in beverage fluid flow lines and serve with a minimum of maintenance.

The features of the present invention which are believed to be novel are set forth with particularity in the appended claims. The present invention, both as to its organization and manner of operation, and together with further objects and advantages thereof, may be understood best by reference to the following description taken in connection with the accompanying drawings.

BRIEF DESCRIPTION OF THE DRAWINGS

FIG. 1 is a schematic diagram of a beverage system incorporating the fluid flow controller of this invention.

FIG. 2 is a longitudinal section through the fluid flow controller of this invention.

FIG. 3 is a section taken generally along the line 3—3 of FIG. 2.

FIG. 4 is an enlarged detail of the area indicated at 4—4 of FIG. 2.

FIG. 5 is a side elevational view of the controller valve body insert, with parts broken away, showing the flow control orifice.

DESCRIPTION OF THE PREFERRED EMBODIMENT

FIG. 1 schematically illustrates drink dispensing system 10 which is arranged for the carbonation of water and the mixing of syrup with the carbonated water to produce a carbonated beverage. Carbon dioxide pressure tank 12 delivers high-pressure carbon dioxide into line 14 as a supply to dual pressure regulator 16. The dual pressure regulator 16 has output lines 18 and 20, each of which contain gaseous carbon dioxide at regulated pressure. Line 18 supplies carbonator 22 which, in turn, supplies carbonated water through line 24 and flow control valve 26 to dispensing line 28. Dispensing line 28 is connected as one of the inputs to dispensing valve 30.

The other line 20 from dual regulator 16 supplies carbon dioxide under pressure to the top of syrup tank 32 so that the syrup therein is continuously pressurized at a nominal value. Syrup line 34 thus contains pressurized syrup suitable for dilution with carbonated water to make the beverage. The inventive flow control valve 36, controls the syrup flow from line 34 to line 38 which, in turn, is connected to the other inlet of dispensing valve 30. Both valves 26 and 36 may be disposed physically within the same housing as dispensing valve 30, and both valves 26 and 36 preferably embody the present invention, although they may have different springs and/or orifices.

Dispensing valve 30 contains an interior structure so that, when it is actuated, both lines 28 and 38 are opened to permit flow of carbonated water and syrup whereby they are mixed to become the desired beverage. The syrup line 34 in particular is subject to variations in flow rate with variations in source pressure, differential pressure, temperature and other variables. In order to provide the proper beverage mix, it is desired that the syrup flow rate be determined solely by the flow control valve 36. Some operators rapidly turn the dispensing valve on and off, with the result that maintaining the proper mixing ratio is very difficult, as described above. Thus it is necessary to provide syrup flow rate which will be dependent solely on the flow control valve 36 which controls the flow orifice therethrough in accordance with pressure in line 34 so that the proper syrup flow control is achieved.

FIG. 2 illustrates flow control valve 36 in detail. Valve body 40 contains bore 42 in which is located body insert 44 which is stationary within bore 42 and is a separate unit from the body both for convenience in manufacturing and so the orifice can be changed to accommodate different spring-rate-to-orifice relationships. Body insert 44 seats on the bottom of bore 42 and is held down by flange 46 which is held in place by clamp ring 48. Body insert 44 has an inner valve bore surface 50 and exterior grooves 52 and 54. O-rings 56, 58 and 60 seal the annular grooves 52 and 54 within bore 42. Inlet port 62 is connected by inner drilling 64 to the bottom of bore 50 and is connected by inner drilling 66 to exterior groove 54. Inlet port 62 is supplied by pressurized syrup from line 34. Outlet port 68 is connected to exterior groove 52 and supplies syrup to line 38.

Spool 70 reciprocates within bore 50. Spool 70 has lower land 72 and upper land 74. The lower face 75 of lower land 72 faces the pressure introduced by port 64. Upper land 74 is sealed by chevron seal 76, see FIG. 4, to prevent syrup leakage. Facing lands 72 and 74 are of equal area and thus are pressure balanced.

Compression spring 78 is mounted in spring housing 80 and bears against the top face 79 of spool 72 to balance the force provided by the syrup pressure against face 75 under the bottom spool 70. The position of spring 78 is adjustable by spring-setting screw 82 which is threadedly engaged in the top of spring housing 80. Spring housing 80 is vented at 84 to prevent the buildup of pressure on top face 79 of spool 70, which would interfere with the balance of forces, between the force of spring 78 and the force due to the pressure of syrup under the spool.

Port 86 permits entry of syrup under pressure from exterior groove 54 into the interior bore 50 between lands 72 and 74. Orifice 88 permits discharge of the syrup from the interior of the bore out into groove 52 and thence out of outlet port 68. As the syrup pressure under spool 70 rises, the spool itself rises until the force resulting from syrup pressure is balanced by the force of spring 78. The rising of spool 70 causes land 72 to cut off part of orifice 88. As an initial adjustment, spring-setting screw 82 is turned to adjust the spring 78 location so as to set the location of land 72 with respect to orifice 88 for the desired full-flow rate at nominal pressure; thereafter, land-to-orifice adjustment occurs automatically. The shape of the orifice and the force of spring 78 are all proportioned so that, at any syrup pressure, there is a controlled flow rate through orifice 88 and thus through valve 36. With spring 78 linear and flow through orifice 88 substantially proportional to pressure, the orifice 88 can be configured as a narrow slot, as shown in FIG. 5. On the other hand, for those syrups which have viscosity such that the flow through a narrow slot is not directly proportional to pressure, a different shape of slot can be provided. In most cases, it would be expected that the bottom of slot 88 would be wider than the top, in the form of an inverted V, as positioned in FIG. 5.

In operation, when connected in the system of FIG. 1, any increases in pressure in line 34 raise spool 70 to reduce the effective area of orifice 88 to control flow. The relationships are such that, with the increased pressure and the reduced area, flow remains constant for any given flow rate determined by the opening of the dispensing valve 30. The manner of operation of dispensing valve 30 requires a flow control valve 36 which is ready to control the flow, rather than one which is responsive to flow after it has started, because of the rapid on/off operation of dispensing valve 30. Thus flow control valve 36 is always ready to provide the control of syrup flow which is necessary to create a carbonated beverage of optimum characteristics.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A carbonated beverage system comprising:
   a beverage syrup tank;
   a water carbonator;
   means for supplying carbon dioxide under pressure to pressurize said syrup tank and for supplying carbon dioxide under substantially constant pressure to supply said carbonator;
   a dispensing valve to dispense carbonated water from said carbonator and beverage syrup from said syrup tank for mixing into a carbonated beverage; and
   a fluid flow control valve connected in the syrup line between said syrup tank and said dispensing valve to control syrup flow to maintain syrup-to-carbonated-water flow ratio for proper carbonated beverage mixing, said fluid flow control valve comprising:
   a. a body;
   b. an inlet and an outlet port in said body respectively to permit fluid flow into said body and fluid flow out of said body;
   c. a bore in said body;

d. a spool reciprocably mounted to move in first and second directions in said bore, said spool having first and second lands defining an interland space and facing each other so that pressure between said lands is balanced on said spool, said spool having a first end face on the outer end of said first land and a second end face on the outer end of said second land;
e. connection means for connecting said inlet to said first end face of said spool so that pressure in said inlet urges said spool in the first direction along its bore;
f. a compressible spring bearing against said second end face of said spool to increase resistance to motion of said spool as said spool moves in said first direction;
g. a hole in said body, said hole venting said body to the atmosphere at a point beyond said second land;
h. an orifice adjacent said first land positioned so that, as said spool moves in said first direction, the area of said orifice is reduced to increase flow resistance, said orifice being serially connected between said inlet and an outlet so that, with increasing pressure in said inlet port, orifice area is reduced to maintain flow substantially constant.

2. A system in accordance with claim 1 wherein:
said orifice is an elongated slot in the direction of motion of said spool.

3. A system in accordance with claim 2 wherein:
said valve has a body and said inlet and outlet are formed in said body, said body having a bore and a body insert positioned within said bore, said body insert having said orifice and said spool reciprocating within said body insert.

4. A system in accordance with claim 3 wherein:
a spring housing is positioned over said spring, said spring housing lying against said body insert to maintain said body insert in place, said spring housing being secured to said body.

5. A carbaonated beverage system comprising:
a beverage syrup tank;
a water carbonator;
means for supplying carbon dioxide under substantially constant pressure to pressurize said syrup tank and for supplying carbon dioxide under pressure to supply said carbonator;
a dispensing valve to dispense carbonated water from said carbonator and beverage syrup from said syrup tank for mixing into a carbonated beverage;
a fluid flow control valve connected in the carbonated water line between said carbonator tank and said dispensing valve to control carbonated water flow to maintain syrup-to-carbonated-water flow ratio for proper carbonated beverage mixing, said fluid flow control valve comprising:
a. a body;
b. an inlet and an outlet port in said body respectively to permit fluid flow into said body and fluid flow out of said body;
c. a bore in said body;
d. a spool reciprocably mounted to move in first and second directions in said bore, said spool having first and second lands defining an interland space and facing each other so that pressure between said lands is balanced on said spool, said spool having a first end face on the outer end of said first land and a second end face on the outer end of said second land;
e. connection means for connecting said inlet to said first end face of said spool so that pressure in said inlet urges said spool in the first direction along its bore;
f. a compressible spring bearing against said second end face of said spool to increase resistance to motion of said spool as said spool moves in said first direction;
g. a hole in said body, said hole venting said body to the atmosphere at a point beyond said second land;
h. an orifice adjacent said first land positioned so that, as said spool moves in said first direction, the area of said orifice is reduced to increase flow resistance, said orifice being serially connected between said inlet and an outlet so that, with increasing pressure in said inlet port, orifice area is reduced to maintain flow substantially constant.

6. A system in accordance with claim 5 wherein:
said orifice is an elongated slot in the direction of motion of said spool.

7. A system in accordance with claim 6 wherein:
said valve has a body and said inlet and outlet are formed in said body, said body having a bore and a body insert positioned within said bore, said body insert having said orifice and said spool reciprocating within said body insert.

8. A system in accordance with claim 7 wherein:
a spring housing is positioned over said spring, said spring housing lying against said body insert to maintain said body insert in place, said spring housing being secured to said body.

* * * * *